United States Patent

Enomoto

[15] 3,643,469
[45] Feb. 22, 1972

[54] MECHANISM FOR WINDING PHOTOGRAPHIC FILM

[72] Inventor: Nobuaki Enomoto, Okaya-shi, Japan
[73] Assignee: Kabushiki Kaisha Yashica, Tokyo, Japan
[22] Filed: Nov. 4, 1969
[21] Appl. No.: 874,000

[30] Foreign Application Priority Data

Nov. 13, 1968 Japan.....................43/82515

[52] U.S. Cl..............................64/23, 64/11, 242/71, 242/71.4, 242/75.5, 242/205, 242/207
[51] Int. Cl.................................................F16d 3/06
[58] Field of Search..............242/71.4, 71.5, 205, 207, 75.5, 242/67.4; 64/30 R, 23, 24, 27, 11, 30 C; 192/54–55, 52–53

[56] References Cited

UNITED STATES PATENTS 1,920,967   8/1933   Carpenter............................242/205
3,042,333   7/1962   Wilder..................................242/75.5

FOREIGN PATENTS OR APPLICATIONS 667,973   5/1949   England...............................242/75.5

Primary Examiner—Stanley N. Gilreath
Assistant Examiner—Milton Gerstein
Attorney—Steinberg & Blake

[57] ABSTRACT

A mechanism for winding photographic film in a device such as a camera. The mechanism includes a rotary drive and a transmission for operating a film winder. The transmission includes a friction clutch which is capable of having the degree of friction thereof adjusted. The transmission coacts with the rotary drive for transmitting the drive therefrom to the film winder. In addition, the transmission responds automatically to an increasing load for automatically increasing the friction of the friction clutch, so that in this way the mechanism adapts itself to the size of the load and is capable of absorbing sudden load increases while maintaining a smooth film movement substantially free of any shocks.

5 Claims, 1 Drawing Figure

PATENTED FEB 22 1972
3,643,469
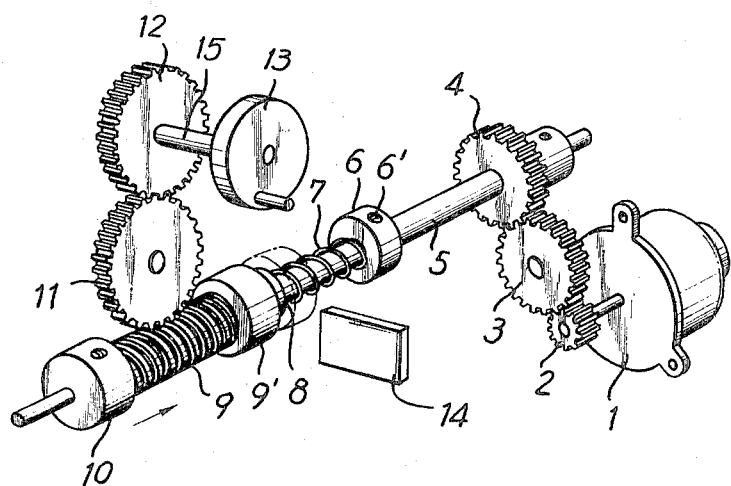
INVENTOR
NOBUAKI ENOMOTO
BY
Steinberg & Blake
ATTORNEYS

MECHANISM FOR WINDING PHOTOGRAPHIC FILM

BACKGROUND OF THE INVENTION

The present invention relates to the winding of film.

As is well known, it is necessary in devices such as cameras and the like to wind film, for example, after exposure thereof, onto a takeup spool or reel. The film is usually maintained in the film plane at the film gate by a pressure plate which is spring-pressed against the film so that the film winding operations take place in opposition to the friction at the pressure plate. In addition, the film is advanced in a stepwise manner, frame by frame, as by a suitable claw mechanism, in the case of a motion-picture camera, for example, and when the film tends to be wound at a relatively high speed, as is the case when the diameter on the takeup reel or spool reaches a substantial magnitude, there may be a sudden application of tension in the film resulting in shock. The result is a lack of smoothness in the film movement, so that a gradual starting and stopping of the film movement at the advance of each frame thereof cannot be maintained.

The above drawbacks are usually aggravated further by the fact that conventional structures are designed to handle the greatest load which is encountered. Thus, as the wound film builds on the takeup spool or reel, the weight of the latter increases requiring more power for the continued rotation of the takeup spool or reel, with the result that the power available during the initial winding of the film is far too great. This factor also contributes to a jerky, nonsmooth film movement which results not only in undesirable stressing of the film but also in undesirable stressing of the mechanism.

SUMMARY OF THE INVENTION

It is accordingly a primary object of the invention to provide a structure which will avoid the above drawbacks.

In particular, it is an object of the invention to provide a structure capable of reliably absorbing any sudden variation in load during intermittent film transportation.

A further object of the invention is to provide a structure which will assure a smooth movement of film to a takeup spool or reel even though a sudden tension and release of tension is encountered by the film.

Yet another object of the invention is to provide a structure which will operate automatically to adapt the magnitude of the force which is transmitted to a film winder to the load which is encountered, so that the force transmitted to the film winder will increase gradually as the load increases.

Also, it is an object of the invention to provide a structure which lends itself to an initial adjustment which is best for a given mechanism.

The object of the present invention also includes the provision of a structure which is compact, simple and relatively inexpensive while at the same time operating very reliably to achieve the desired results.

According to the invention, the mechanism includes a rotary drive means and a transmission means for operating a film winder. The transmission means includes a friction clutch provided with an adjusting means for adjusting the friction thereof. This transmission means coacts with the rotary drive means for transmitting the drive therefrom to the film winder and for automatically actuating the adjusting means to increase the friction of the friction clutch as the load at the film winder increases.

BRIEF DESCRIPTION OF DRAWING

The invention is illustrated by way of example in the accompanying drawing which forms part of this application and which shows in a schematic, perspective illustration one possible embodiment of a structure according to the invention, with part of the structure shown in phantom lines in the position assumed thereby upon encountering a load increase.

DESCRIPTION OF PREFERRED EMBODIMENTS

Referring now to the drawing, a rotary drive means 5 is illustrated therein. This rotary drive means takes the form of an elongated shaft supported at its ends for rotary movement in any suitable stationary bearings. The illustrated structure may form part of a photographic camera, for example, and stationary walls of the camera may be provided with bearings to support the shaft 5 for rotation about its axis.

In the illustrated example shaft 5 fixedly carries a gear 4 which meshes with an idler gear 3 supported in any suitable way for rotation about its axis. This gear 3 in turn meshes with a pinion 2 fixed to the output shaft of a motor 1 such as a suitable electric motor, so that in the illustrated example it is this motor 1 which forms a source of power used for providing the rotary drive means 5 with its rotary movement.

The illustrated structure also includes a transmission means for operating a film winder 13. The film winder 13 is driven by the output shaft 15 of the transmission means. In the illustrated example the film winder 13 is in the form of a disk centrally fixed to the output shaft 15 to be rotated thereby and operatively connected in any suitable way with a takeup reel or spool for rotating the latter to wind the film thereon.

The transmission means further includes a gear 12 fixed to the shaft 15 and a worm wheel 11 which meshes with the gear 12 and with a worm 9 of the transmission means. The transmission means also includes a friction clutch 8, 9' which is provided with an adjusting means for adjusting the force of friction thereof.

This latter adjusting means is formed in part by the worm 9 which terminates at one end in the flange 9' which forms part of the friction clutch by frictional engagement with the annular friction element 8 which surrounds the shaft 5. This adjusting means further includes a coil spring 7 which is coiled about the shaft 5 and presses at one end against the friction element 8 so as to urge the latter against the friction element 9'. The opposite end of the coil spring 7 presses against, or may be fixed with, a collar 6 which is releasably fixed at a selected location along the shaft 5 by a setscrew 6'. At its end opposite from the end where the gear 4 is located, the shaft 5 fixedly carries a collar 10 which engages the end of the worm 9 when the latter is in the solid-line position shown in the drawing. The worm 9 is formed with an axial bore passing therethrough so that while it is supported by the shaft 5 it is freely rotatable and axially movable with respect to the shaft 5. Therefore, the only rotary movement of the worm 9 which will result in rotation of the worm wheel 11 must be derived from the rotary drive means 5 through the friction clutch 8, 9'.

As a result of this construction, it is possible for the worm 9 to move in the direction of the arrow shown in the drawing to a position such as the phantom line position where the spring 7 of the adjusting means is compressed to a greater degree so as to increase the force of friction at the friction clutch 8, 9'. A limiting means 14 is provided for limiting the extent to which the worm 9 is axially movable along the shaft 5. This limiting means 14 takes the form of a simple stationary stop member carried by any stationary component of the camera or the like and situated in the path of movement of the worm 9, more particularly its end flange 9', so that in this way the extent to which the worm 9 can be axially displaced is limited.

The above structure operates as follows:

The structure described above and shown in the drawing may form part of a motion-picture camera or a still camera. In the latter case the illustrated structure forms part of a still camera designed to make rapid exposures of film frames one after the other with the film being transported in this case by a known mechanism driven, for example, from the gear 4 in an unillustrated manner. In the case of a motion-picture camera, a film-advancing claw mechanism, well known in the art, may also be driven through a suitable transmission which is unillustrated and which derives its motion from the gear 4. In either case, when the camera or the like is operated, the motor 1 is energized so as to actuate the rotary drive means formed by the shaft 5. Thus, at this time the shaft 5 rotates continuously while the film is intermittently transported from one frame to the next. The exposed film is wound by the film winder 13 onto the unillustrated takeup reel or spool which is driven from the film-winding disk 13 in any suitable manner. The drive is transmitted from the shaft 5 through the friction clutch 8, 9' to the worm 9 which rotates the worm wheel 11 so as to provide for rotation of the gear 12. The collar 6 is initially adjusted on the shaft 5, by way of the setscrew 6', so as to provide for the spring 7 an initial degree of compression, in accordance with the operating conditions. The structure will operate initially with a minimum force of friction at the friction clutch 8, 9' but this force will be sufficient to initiate the winding of the film at the beginning of the operations when the load is at a minimum. However, during the continued winding of the film the load will increase so that the worm wheel 11 will tend to remain stationary because the force of friction at the friction clutch is insufficient to transmit the required drive through the worm 9 to the worm wheel 11. Therefore, at this time the worm 9 will continue to rotate but will be incapable of continuing the rotation of the worm wheel 11. The result is that the worm 9 instead moves axially with respect to the worm wheel 11 in the direction of the arrow shown in the drawing, thus moving the entire friction clutch 8,9' together with the worm 9 axially along the shaft 5 toward the collar 6. In this way the distance between the friction element 8 and the collar 6 is reduced so as to increase the compression of the spring 7 and thus increase the friction of the friction clutch. This adjustable movement will take place until the force transmitted through the friction clutch is sufficiently great to accommodate itself to the increased load, and then the wheel 11 will start to turn so as to continue the film-winding operations. Thus, when the force of friction at the friction clutch exceeds the load which tends to resist the rotation of the film winder 13, the rotation of the latter will continue. When the load is reduced or eliminated, the worm 9 will automatically return to its original position by expansion of the spring 7. The limiting means formed by the stop member 14 limits the extent to which the worm 9 can move toward the collar 6 so as to limit the extent of compression of the spring 7. In this way the maximum force which can be transmitted is determined. Thus, if it should happen, for example, that for some unforeseen reason rotation of the film winder 13 is rendered impossible and would result in injury to the components, the worm 9 will simply engage the limiting means 14 so that all that can happen after this point is that the clutch will slip and the parts will not become damaged. In this way forced rotation of the film winder 13 is prevented. As was indicated above the initial force of the spring 7 may be adjusted by adjusting the position of the collar 6 along the shaft 5, and it will be noted that this adjustment not only determines the initial compression of the spring 7 but also determines the maximum compression thereof because adjusting of the collar 6 along the shaft 5 also adjusts the position of the collar 6 with respect to the limiting means 14.

It is to be noted that when the diameter of the takeup reel or spool becomes fairly substantial, the increased diameter will result in more rapid linear movement of the film with a tendency toward excessive rotation of the film winder 13. However, such excessive rotation if it is encountered is absorbed by slippage at the friction clutch 8,9'. Furthermore, due to rapid movement of the film and the intermittent film transportation, impacts are transmitted to the disk 13. However, these impacts are readily absorbed by movement of the worm 9 along the shaft 5 and slippage at the clutch 8,9' so that such impacts are not transmitted directly to the drive system with the result that the components are protected and will have a far greater operating life. It is to be noted, in particular, that the movement of the worm 9 along the shaft 5 with compression and expansion of the spring 7 prevents any sudden tension from being exerted upon the film which is wound onto the takeup reel or spool, so that there is a smooth starting and stopping of the film in a fully reliable manner at the film gate as each frame is advanced to the exposure position. Therefore, when any sudden stopping of the rotation of the disk 13 is encountered for any reason, the reaction resulting from such a sudden termination of the rotary movement of the disk 13 will be reliably absorbed.

It is apparent, therefore, that the above-described structure of the invention provides an exceedingly practical assembly which may be used with great advantage for purposes such as those set forth above.

What is claimed is:

1. In a mechanism for winding photographic film, rotary drive means and transmission means for operating a film winder, said transmission means including a friction clutch having an adjusting means for adjusting the friction thereof, and said transmission means coacting with said rotary drive means for transmitting the drive thereof to the film winder for operating the latter and for automatically actuating said adjusting means to increase the friction of the friction clutch in response to an increased load at the film winder, said rotary drive means being in the form of a rotary shaft and said transmission means including a worm formed with an axial bore through which said shaft freely extends so that said worm is freely rotatable and axially movable with respect to said shaft, said transmission means including a worm wheel driven by rotation of said worm, and said friction clutch of said transmission means directly transmitting rotary movement of said shaft to said worm and including a pair of friction clutch elements in permanent frictional engagement with each other, one of said clutch elements being fixed to said worm, said worm wheel tending to remain stationary when the load increases so that the worm then rotates with respect to the worm wheel to be advanced axially along said shaft, and said adjusting means being operatively connected to the other of said clutch elements and said shaft, for transmitting rotation of said shaft to said other clutch element and for responding to the axial movement of said worm along said shaft for increasing the friction of the friction clutch until the drive is again transmitted through the worm wheel, whereby the friction of the clutch is automatically increased to an extent which will again provide for rotation of the worm wheel by the worm.

2. The combination of claim 1 and wherein said adjusting means includes a coil spring coacting with said friction element and with said other rotary drive shaft to transmit rotation of the latter through said other friction element to said worm, said worm when displaced along said drive shaft upon encountering an increasing load compressing said spring for increasing the friction between the latter and the friction element until the drive is again transmitted to said worm wheel.

3. The combination of claim 2 and wherein a collar is releasably fixed to said shaft and engages an end of said spring distant from said friction element, so that the location of said collar along said shaft can be adjusted for determining initially the compression of said spring.

4. The combination of claim 1 and wherein a stop means is situated in the path of movement of said worm for limiting the extent of axial movement thereof.

5. The combination of claim 1 and wherein a driving motor is operatively connected with said shaft for rotating the latter.

* * * * *